A. V. ROWE.
REFRIGERATOR.
APPLICATION FILED JULY 6, 1908.
925,727.
Patented June 22, 1909.
2 SHEETS—SHEET 2.
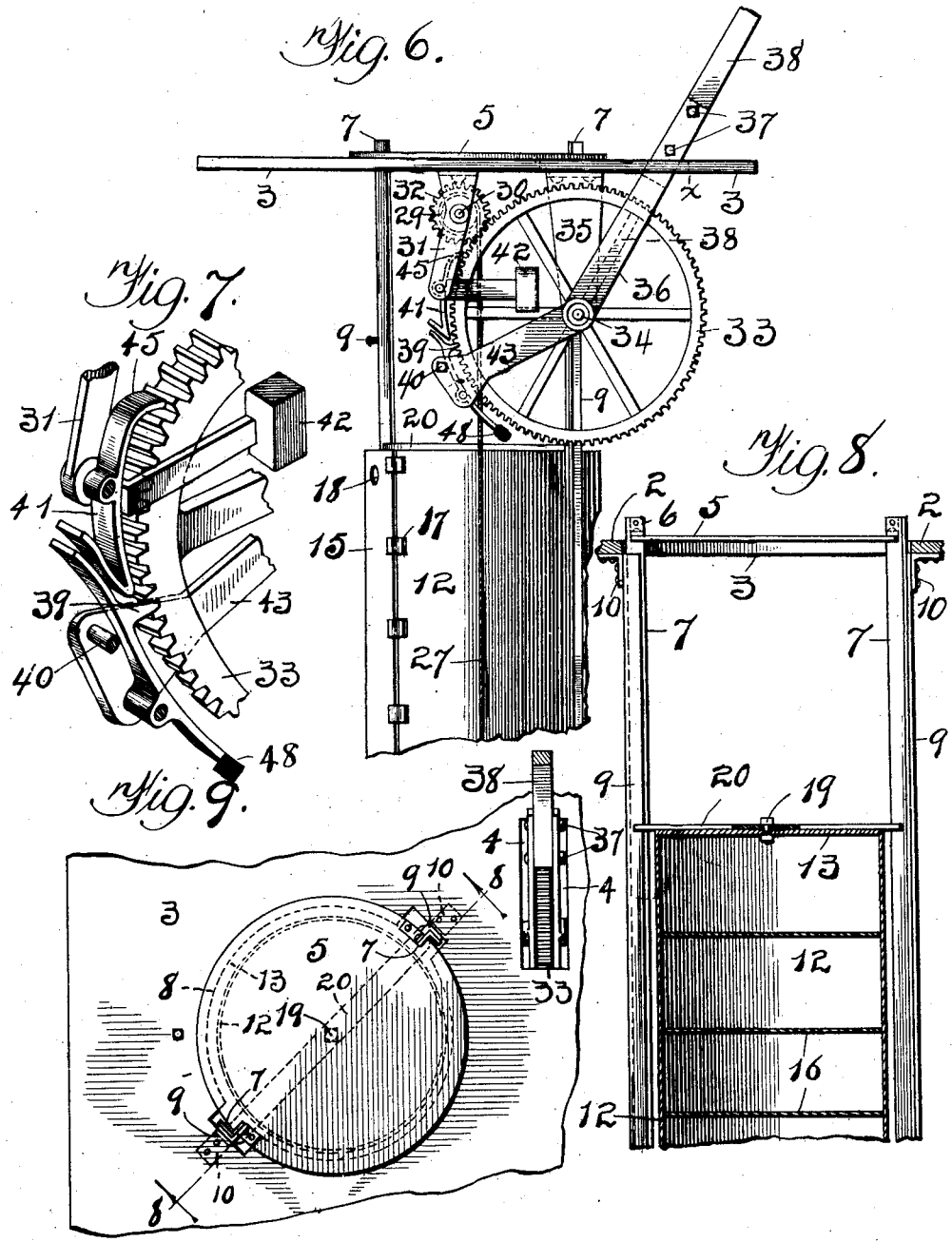

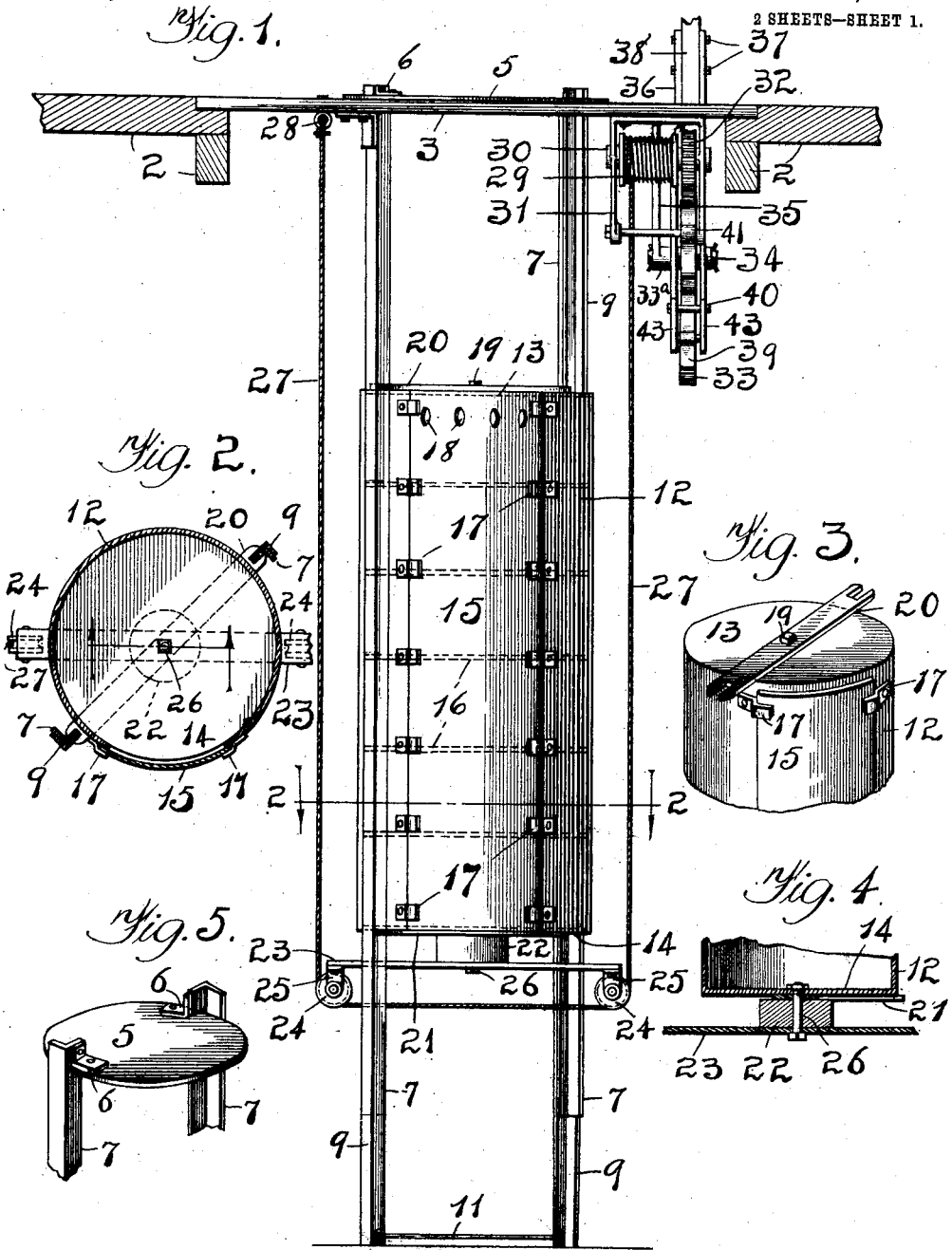

UNITED STATES PATENT OFFICE.

ALVIN V. ROWE, OF GALESBURG, ILLINOIS.

REFRIGERATOR.

No. 925,727.　　　　Specification of Letters Patent.　　　Patented June 22, 1909.

Application filed July 6, 1908. Serial No. 442,125.

*To all whom it may concern:*

Be it known that I, ALVIN V. ROWE, a citizen of the United States, and a resident of Galesburg, in the county of Knox and State of Illinois, have invented a new and useful Refrigerator, of which the following is a specification.

The invention relates to that class or type of devices which are adapted to contain foods, foodstuffs, beverages etc., and which are further adapted to be lowered into a well or other hole in the earth to be cooled, and to be raised therefrom for access.

The primary object of the invention is to provide improved means whereby raising and lowering of the cage or food-container may be effected.

A further object is to dispense with an arch or other support, and with winding and elevating mechanism which is above the surface of the ground and exposed to the deleterious action of the elements, and by dispensing with tubing beneath the ground. By doing away with an elevated support, and by dispensing with a lower tube or caisson, I not only attain simplicity and practical perfection, but provide a device which can be more economically manufactured and sold than heretofore, and one which is not only obscured from view and out of the way, but which is not liable to be opened by unauthorized persons.

Subsidiary objects will appear as the nature of the invention is more fully disclosed.

To the end of carrying out these main ends and objects, the invention consists in constructions and combinations hereinafter described and claimed. And while I have in the accompanying drawings shown and shall herein describe a specific construction, I do not wish to be considered as limiting my claims to such alone, as various unessential changes and modifications may be made, and some of the improvements may be used without the others, all of which fairly fall within the scope of the invention.

In order that the invention may be better understood I have appended hereto drawings which illustrate it in the best form now known to me, and in which:—

Figure 1 is a front elevation, showing also a fragment of a well-curb; Fig. 2, a sectional view on the line 2—2 in Fig. 1; Fig. 3, a fragmental detail in perspective; Fig. 4, a fragmental detail in sectional elevation, taken on the line indicated by the arrows in Fig. 2; Fig. 5, a fragmental detail in perspective; Fig. 6, a side elevation, partly broken away; Fig. 7, an enlarged detail of the ratchet and dog mechanism; Fig. 8, a section, partly in elevation, taken on the line 8—8 in Fig. 9; and Fig. 9, a top plan.

Referring to the drawings by numerals, the same one indicating the same part in the different figures, 2 indicates a well-curb upon which is placed a suitable cast-metal base plate 3 provided with a central opening 8 and a slot 4. The plate 3 may be variously apertured for the reception of bolts by which the brackets hereinafter described are fixed thereto 5 represents a cover-plate fixed by brackets 6 to a pair of movable guides 7 which are preferably L-shaped, or of angle iron. The cover-plate rests on the base 3 and covers the opening 8 therein when the cage or food-container is lowered. Stationary guides 9 are fixed by brackets 10 to the base-plate, and are held properly spaced at their lower ends by a rod 11. It will be evident that the guides 9 are similar in contour to the guides 7 and that they constitute a way therefor. I have shown the guides 7 as fixed to the cover-plate by brackets secured to the top thereof; it will be evident that these brackets may be beneath said plate, in which event the ends of the guides need not project.

The cage may be of any suitable and preferred construction. I have shown it, however, as comprising a cylindrical casing 12, (the front of which is open,) a top 13, a bottom 14, a sliding door 15, and shelves 16. The door slides freely within ears 17 fixed to each side of the wall at the open front of the casing. It is preferably provided also with air inlets 18 for a manifest purpose. The casing or cage is pivoted at its upper portion by a pintle 19 in a guide-plate 20, and is supported at its lower portion on a guide-plate 21 pivotally mounted by means of a bolt 26 on a block 22 supported on an elevating-plate 23 which carries depending pulleys 24 secured thereto by brackets 25. The guide plates 20 and 21 are notched at their ends and stride that portion of the guides 7 and 9 which projects inwardly. Thus mounted, when the cable is wound up as will presently be described, the plates 20 and 21 will travel vertically on the guides, and the lower plate will elevate, and both plates will guide the cage until it has passed through the opening 8 in the plate 3, whereupon it will contact and elevate the cover 5 and thereby the guides 7. The cover may be enlarged to cover the slot 4, or any other means may be employed for the same purpose.

One end of a cable 27 is fixed to an eye 28 secured to the base 3. It is thence passed underneath the pulleys 24 and its other end secured to and wound upon a drum 29 carried on a shaft 30 mounted in bearings in a bracket 31 depending from said base. A pinion 32 is also splined on the shaft 30 and gears with a spur-wheel 33 mounted on a stub 34 seated in a bearing 33$^a$ in a bracket-arm 35 fixed to and depending from the base. Fulcrumed on the stub 34 is a lever of the first order, the power arm 36 of which is bifurcated and straddles the wheel 33, its free end portions being fixed together by bolts 37. A lever-bar or handle 38 is bifurcated at its lower end to stride the bolts 37 and to be slipped loosely between the plates of the power arm, providing an actuating means which may be instantly applied or detached, and which may be placed out of access by unauthorized persons. The weight arm 43 of the lever is also bifurcated and extends past the perimeter of the spur-wheel and there carries a pivoted ratchet 39, the lower end of which is prevented from contact with the cogs of the wheel 33 by a boss 40. A small counterweight 48 effects proper engagements. A double-ended dog 41 is pivoted in the lower portion of the bracket 31 and is shown as integral with a counterweight 42 which may be dispensed with if preferred.

In operation, supposing the parts to be in the positions shown at Fig. 1 and it is desirable to further raise the cage, the operator will grasp the handle 38 and give a forward impulse thereto, or to the left hand. The point of the latch 39 will be freed from the cogs of the spur, the heel 45 of the dog 41 preventing it from turning to permit the cage to fall. Upon rocking the handle in a contrary direction, the counterweight 48 will cause the ratchet 39 to engage a cog on the periphery of the wheel 33 and drive it in a direction to revolve the pinion and thereby the drum to the left, whereby the cable will be taken up and the cage elevated in an evident manner. When the top thereof has reached the cover 5 it will elevate the latter, the rocking motion of the lever imparting intermittent rotary motion to the drum as above described. The guides 9 will direct the guides 7, and the latter will move upwardly with the cage. The plates 20 and 21 maintain the cage at all times in a vertical position, and it will be clear that it may be elevated to such extent that its bottom 14 will be above the upper edge of the drum and therefore easily accessible. Lowering of the cage is effected by throwing the lever rearwardly to its extreme extent, indicated at $x$, Fig. 6, in which position the point of the ratchet will be freed from the cogs of the wheel 33 and will ride the projection at the point of the friction dog 41, and the latter will be held in frictional contact with said cogs by reason of the lever pressure, such pressure being regulated by the weight of the contents of the cage.

Having thus described my invention, its construction and operation, and having set forth its objects and advantages, I claim as new and desire to secure by Letters Patent the following, to-wit:—

1. In a refrigerator, a base-plate provided with a central aperture, a cage adapted to pass therethrough, a cover for said aperture, guides fixed thereto and adapted to move therewith, stationary guides with which they co-act, a guide-plate above the cage, a guide-plate below the cage, said guide-plates adapted to co-act with the movable and the stationary guides, and means for elevating the cage.

2. In a refrigerator, a base-plate provided with a central aperture and a slot, a cage adapted to pass through said aperture, a cable, one end of which is fixed, passing beneath said cage and adapted to sustain it, a drum on which the other end of the cable is adapted to be wound, means for winding said drum, and a handle passed through said slot and adapted to actuate said means.

3. In a refrigerator, a base-plate provided with a central aperture and a slot, a cage adapted to pass through said aperture, a cable, one end of which is fixed, passing beneath said cage and adapted to sustain it, a drum on which the other end of the cable is adapted to be wound, means disposed beneath the aforesaid plate and adapted to actuate said drum, and a handle passed through said slot and adapted to actuate said means.

4. In a refrigerator, a base-plate provided with a central aperture and a slot, a cage adapted to pass through said aperture, a cable, one end of which is fixed, passed beneath said cage and adapted to sustain it, a drum on which the other end of the cable is adapted to be wound, means for imparting movement to the drum, and a removable handle adapted to be passed through said slot and to engage said means to actuate it.

5. In a refrigerator, a base-plate provided with a central aperture, a cover therefor, a cage adapted to pass through said aperture, means for elevating it, stationary guides beneath said base-plate, movable guides adapted to co-act with said stationary guides to guide the cage, and guide-plates above and below said cage, said plates adapted to stride and have vertical movements on said guides.

In testimony whereof I have hereunto set my hand this 1st day of July, 1908.

ALVIN V. ROWE.

In presence of—
 H. M. RICHARDS,
 J. M. BOSTON.